United States Patent
Zywiak et al.

(10) Patent No.: US 7,322,202 B2
(45) Date of Patent: Jan. 29, 2008

(54) ELECTRIC MOTOR DRIVEN SUPERCHARGER WITH AIR CYCLE AIR CONDITIONING SYSTEM

(75) Inventors: Thomas Zywiak, Suffield, CT (US); Paul H. McMurtry, Seattle, WA (US); Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 310 days.

(21) Appl. No.: 10/946,907

(22) Filed: Sep. 22, 2004

(65) Prior Publication Data
US 2006/0059927 A1 Mar. 23, 2006

(51) Int. Cl.
F25B 9/00 (2006.01)
F25D 9/00 (2006.01)

(52) U.S. Cl. ............................. 62/86; 62/401

(58) Field of Classification Search ............ 62/172, 62/323.3, 408, 401, 404, 427, 39.52, 751, 62/86, 402
See application file for complete search history.

(56) References Cited

U.S. PATENT DOCUMENTS

| | | | | |
|---|---|---|---|---|
| 4,099,374 A | * | 7/1978 | Foster-Pegg | 60/39.12 |
| 4,262,495 A | * | 4/1981 | Gupta et al. | 62/402 |
| 4,434,624 A | | 3/1984 | Cronin | |
| 4,523,517 A | | 6/1985 | Cronin | |
| 4,875,345 A | * | 10/1989 | Signoret | 62/402 |
| 4,963,174 A | * | 10/1990 | Payne | 62/87 |
| 4,969,798 A | * | 11/1990 | Sakai et al. | 415/157 |
| 5,114,103 A | * | 5/1992 | Coffinberry | 244/209 |
| 5,251,434 A | * | 10/1993 | Sugita et al. | 60/39.182 |
| 5,709,103 A | * | 1/1998 | Williams | 62/402 |
| 5,967,461 A | * | 10/1999 | Farrington | 244/118.5 |
| 6,124,646 A | * | 9/2000 | Artinian et al. | 290/52 |
| 6,295,822 B1 | * | 10/2001 | Mueller | 62/172 |
| 6,942,183 B2 | * | 9/2005 | Zywiak | 244/118.5 |
| 2004/0129835 A1 | | 7/2004 | Atkey et al. | |

FOREIGN PATENT DOCUMENTS

EP 1346914 9/2003
JP 2001-329996 A * 11/2001

OTHER PUBLICATIONS

European Search Report, Nov. 14, 2006.

* cited by examiner

Primary Examiner—Mohammad M. Ali
(74) Attorney, Agent, or Firm—Carlson, Gaskey & Olds

(57) ABSTRACT

An inventive air conditioning system includes an air conditioning pack for receiving pressurized air and converting the pressurized air into conditioned air for an aircraft. Pressurized air is provided by a compressed air supply system that is fluidly connected to the air conditioning pack for providing air to the air conditioning pack. The compressed air system includes a compressor driven by an electric motor. The electric motor is commanded by a controller to provide pressurized air when needed. In particular, the controller commands the electric motor based upon a desired conditioned airflow that is to be provided by the air conditioning pack. For high altitude aircraft, applications, a diffuser is used to increase the efficiency of the compressor within the compressed air supply system.

13 Claims, 2 Drawing Sheets

ELECTRIC MOTOR DRIVEN SUPERCHARGER WITH AIR CYCLE AIR CONDITIONING SYSTEM

BACKGROUND OF THE INVENTION

This invention relates to an electric motor driven supercharger for use with an air cycle air conditioning system.

Aircraft air conditioning systems typically use compressed air supplied to an air conditioning pack from bleed air from a turbine engine. The bleed air is provided by bleed ports on the turbine engine and typically must be passed through a precooler prior to the air conditioning pack.

Pressurized air is provided by two bleed ports on the turbine engine. The selection of the bleed stage used during mid to high engine power settings are matched to the pressure required by the air conditioning system for high altitude, hot day cruise conditions or set by the location of the first engine compressor stage where it is convenient to extract the air from the engine compressors. In either case, once the bleed port is defined and the air conditioning system is designed to that pressure, at lower altitude flight conditions and/or cooler ambient day conditions there is more pressure than required by the air conditioning system. The excess bleed air pressure is throttled off as waste for all but the worst case conditions, such as the highest altitude at the hottest day.

Superchargers have been used to supply pressurized air to vapor cycle air conditioning packs. The superchargers are driven by turbines that are powered by bleed air. The supercharger arrangements have similar issues as systems providing pressurized air through bleed ports in that bleed air pressure driving the power turbine throttled off as waste.

What is needed is an aircraft air conditioning system that supplies only the needed pressure level of supplied air to the air conditioning pack to reduce waste of energy in the system.

SUMMARY OF THE INVENTION

An inventive air conditioning system includes an air conditioning pack for receiving pressurized air and converting the pressurized air into conditioned air for an aircraft. Pressurized air is provided by a compressed air supply system that is fluidly connected to the air conditioning pack for providing air to the air conditioning pack. Unlike prior art systems, the compressed air supply system includes a compressor driven by an electric motor. The electric motor is commanded by a controller to provide pressurized air when needed. In particular, the controller commands the electric motor based upon a desired conditioned airflow that is to be provided by the air conditioning pack. The electric motor drives the compressor at a speed that provides the pressurized air needed by the air conditioning pack to produce the desired conditioned airflow.

For high altitude aircraft applications, a variable diffuser is used to prevent a compressor surge condition and to increase the efficiency of the compressor within the compressed air supply system.

Accordingly, the present invention provides an aircraft air conditioning system that supplies only the needed pressurized air to the air conditioning pack to reduce waste of energy in the system.

These and other features of the present invention can be best understood from the following specification and drawings, the following of which is a brief description.

DETAILED DESCRIPTION OF THE PREFERRED EMBODIMENT

Figure 1:
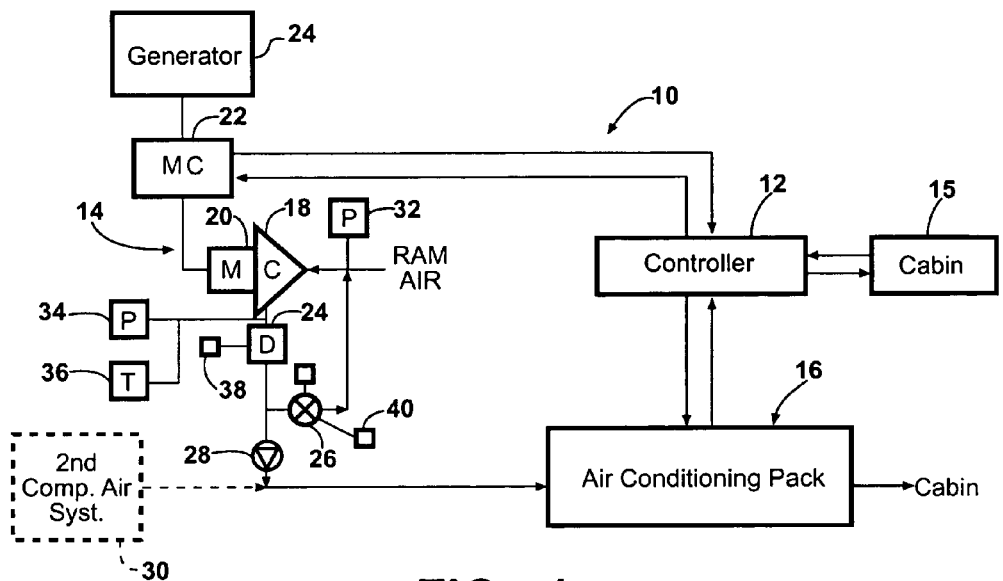
FIG. 1 is a highly schematic view of one example of the inventive air conditioning system.

A highly schematic depiction of one example of the inventive air conditioning system 10 is shown in FIG. 1. The system 10 includes a controller 12 that commands and coordinates a compressed air supply system 14 and an air conditioning pack 16. The controller 12 may receive inputs from a cabin control 15 requesting a desired conditioned airflow. The controller 12 may be integrated with other controllers or separated into sub-controllers located throughout the aircraft.

In the example shown, the air conditioning pack 16 is an air cycle air conditioning pack that includes an air cycle machine having a compressor and a turbine; a heat exchanger; and air conditioning components such as a condenser, a water collector, and a reheater.

The compressed air supply system 14 includes a compressor 18 driven by an electric motor 20. The electric motor 20 has a motor controller 22 associated with the electric motor 20. Power is provided to the motor controller 22 by a generator 23. The motor controller 22 communicates with the controller 12 and drives the compressor 18 with the electric motor 20 in response a desired speed request from the controller 12. The desired speed request corresponds to a desired pressurized air level from the air supply system 14 to be provided to the air conditioning pack 16 to achieve the desired conditioned airflow. The compressor 18 does not generate wasted pressure, and the electric motor 20 only uses the power needed to generate the desired pressurized air.

A second compressed air supply system 30 can also be fluidly connected to the air conditioning pack 16 to provide pressurized air in addition to the pressurized air provided by the compressed air supply system 14, if desired. The second compressed air supply 30 operates in a similar manner to the compressed air supply system 14 described above and below.

The compressor 18 receives ram air at a compressor inlet and expels pressurized air through a compressor outlet. The compressed air expelled from the compressor 18 may be recirculated to the compressor inlet by modulating a surge control valve 26. The surge control valve 26 opens moves from a closed position to an open position to increase the heat of the compressed air, in particular, at low altitude cold day conditions. The surge control valve 26 may include a surge control valve position sensor 40 that is connected to the controller 12 (not shown for clarity) to ensure proper operation of the surge control valve 26. The surge control valve 26 also opens to prevent the compressor from operating in an unstable surge condition if the compressor's flow drops to an undesirable point by increasing the flow through the compressor.

Flow through the compressor 18 is calculated by utilizing inlet and outlet pressure sensors 32 and 34 and an outlet temperature sensor 36. The sensors 32, 34 and 36 communicate with the controller 12 (not shown for clarity) to monitor the operation and efficiency of the compressor 18. Typical prior art compressed air supply systems utilize a flow sensing venturi downstream of the compressor to measure the flow. The resistance of the system 10 changes as the altitude changes. As the altitude changes, the efficiency of the compressor will decrease, especially in high altitude applications. This is due to increased volumetric flow through the system 10. To this end, a variable area diffuser 24 is arranged downstream of the compressor outlet to improve the efficiency of the compressor 18 and ensure stable operation.

Figure 2:
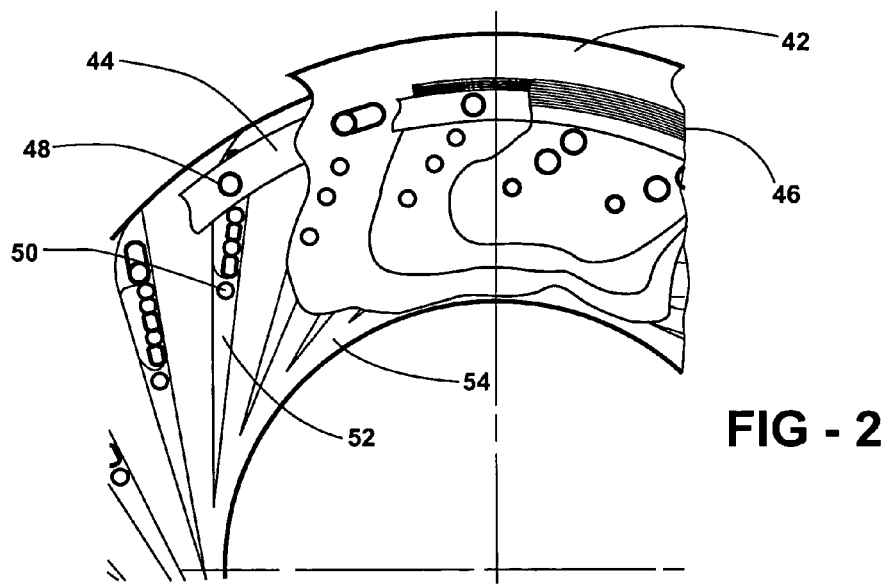
FIG. 2 is a partial cross-sectional view of variable area diffuser used in the inventive air conditioning system.

One example variable area diffuser 24 suitable for high altitude applications is shown in FIG. 2. The compressed air from the compressor outlet flows into the diffuser 24. The diffuser 24 includes adjustable vanes 52 that are actuated as a group to modulate the diffuser flow area from full open down to approximately forty percent of full open. Each vane 52 rotates about a pivot pin 50. A drive ring 44 is positioned by an actuator (not shown) and includes a drive pin 48 extending from a backing plate 54 that engages the exit end of each vane 52. The drive ring 44 is supported by a bearing 46 and is rotated relative to a fixed shroud 42. Pivoting the vanes 52 with the drive ring 44 varies the diffuser area.

Figure 3:
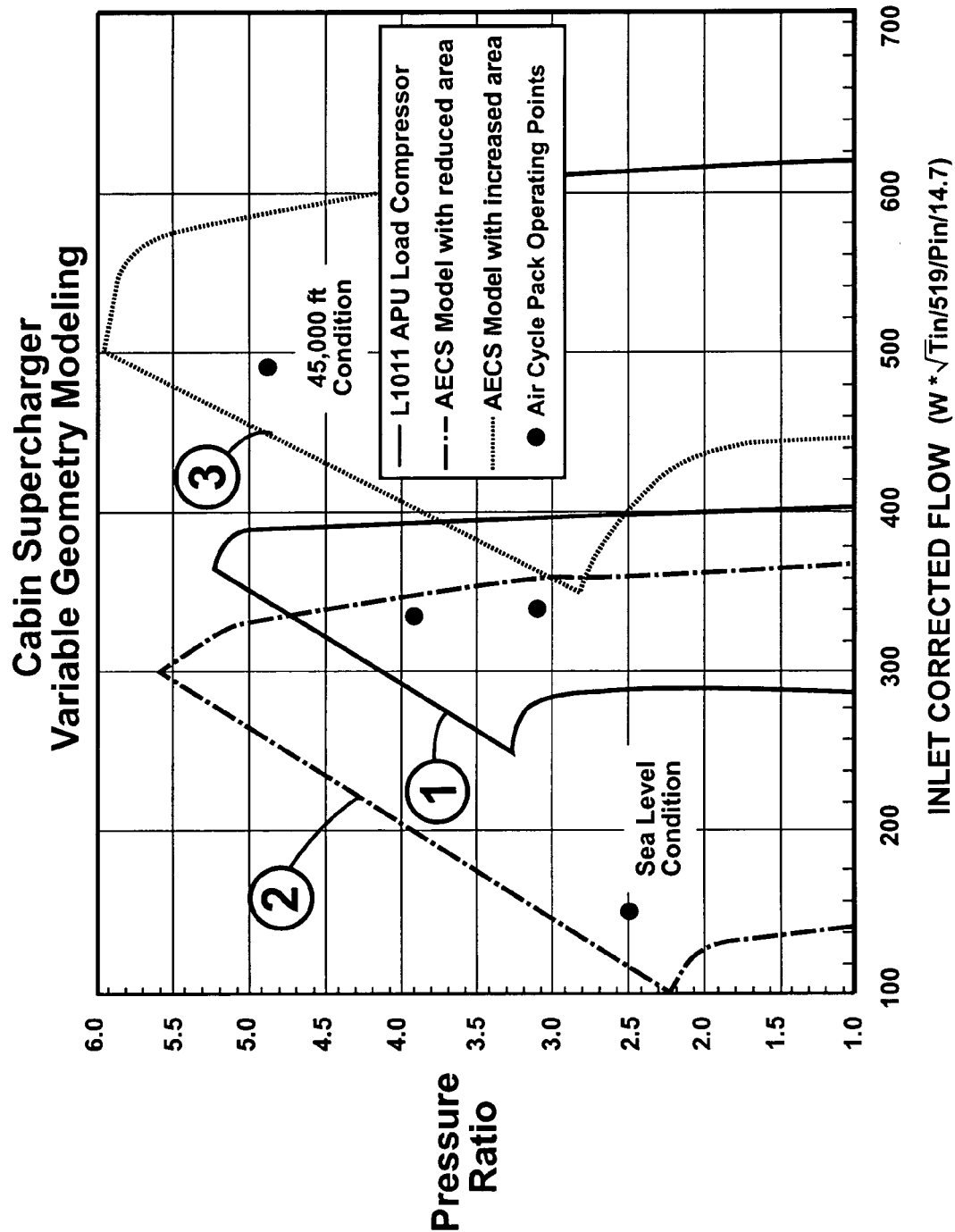
FIG. 3 is a graphical depiction of the compressor performance curves of the compressed air supply system in response to actuation of the variable area diffuser.

Referring now to FIG. 3, two operating modes of the inventive compressed air supply system 14 with variable area diffuser 24 are shown relative to a baseline compressor performance curve. Baseline compressor performance curve One depicts a typical fixed geometry compressor. The points on the graph illustrate various air conditioning pack operating points at various altitudes. In order for the compressor to operate efficiently with stability, the points must fall within the curve of the compressor. As shown by the graph of FIG. 3, a fixed geometry compressor cannot encompass the sea level and high altitude conditions.

Compressor curves Two and Three respectively illustrate a compressor used in conjunction with a variable area diffuser, for example the diffuser shown in FIG. 2, in the minimum and maximum area positions. Curve Two encompasses the sea level condition and intermediate altitude conditions with the diffuser area reduced, and curve Three encompasses the high altitude condition with the diffuser area increased.

In operation, a desired air condition airflow is requested by the cabin controls 15. The controller 12 communicates with and commands the air conditioning pack 16 and compressed air supply system 14 to sufficiently satisfy the desired conditioned airflow. In particular, the controller 12 commands the air conditioning pack 16 to produce the desired conditioned airflow based upon a desired air pressure supplied to the air conditioning pack. The controller 12 commands the electric motor by communicating with the motor controller 22 to drive the compressor 18 at a desired speed. The desired speed corresponds to a desired air pressure. The surge control valve 26 recirculates compressed air back to the compressor 18 as needed to provide the desired pressurized air to the air conditioning pack 16 at a desired temperature. The diffuser 24 is adjusted by the controller 12 to a position that achieves a desired efficiency for the compressor while avoiding a surge condition. The diffuser 24 maintains stability of the compressor 18 throughout operation at various altitudes.

The controller 12 also communicates with second compressed air supply system 30 as needed in a similar manner to that of the compressed air supply system 14. In particular, it may be more efficient to operate with only one compressed air supply system during ground conditions. A check valve 28 may be arranged between the systems 14 and 30 to prevent back flow into one of the compressors 18.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air conditioning system comprising:
   an air conditioning pack for receiving pressurized air and converting the pressurized air into conditioned air for an aircraft;
   a compressed air supply system fluidly connected to the air conditioning pack for providing pressurized air to the air conditioning pack, the compressed air supply system including a compressor driven by an electric motor, the compressor providing the pressurized air; and
   wherein the air conditioning pack includes a heat exchanger, an air cycle machine having an ACM compressor and a turbine, and a condenser, the ACM compressor different than the compressor, the air cycle machine compressing and expanding the pressurized air respectively with the ACM compressor and the turbine.

2. The air conditioning system according to claim 1, wherein the air conditioning pack is an air cycle air conditioning pack.

3. The air conditioning system according to claim 1, wherein the compressed air supply system includes a variable area diffuser in fluid communication with an outlet of the compressor, the diffuser movable between multiple position to adjust compressor efficiency.

4. The air conditioning system according to claim 1, wherein a surge control valve is arranged downstream of the compressor and before the air conditioning pack.

5. The air conditioning system according to claim 4, wherein the surge control valve is movable between open and closed positions, the surge control valve directing the pressurized air from the compressor to an inlet of the compressor to reheat the pressurized air.

6. The air conditioning system according to claim 1, wherein a second compressed air supply system is fluidly connected to the air conditioning pack, and a check valve is arranged between the compressed air supply system and the second compressed air supply system.

7. The air conditioning system according to claim 4, comprising compressor inlet and outlet pressure sensors selectively associated with a compressor inlet and outlet, and a compressor outlet temperature sensor, the sensors for determining compressor flow.

8. The air conditioning system according to claim 1, comprising a controller communicating to the compressed air supply system and the air conditioning pack, the controller commanding the electric motor to drive the compressor at a desired speed producing a desired pressurized airflow for the air conditioning pack.

9. An air conditioning system comprising:
   an air conditioning pack for receiving pressurized air and converting the pressurized air into conditioned air for an aircraft;
   a compressed air supply system fluidly connected to the air conditioning pack for providing pressurized air to the air conditioning pack, the compressed air supply system including a compressor driven by an electric motor, the compressor providing the pressurized air;

wherein the surge control valve is movable between open and closed positions, the surge control valve directing the pressurized air from the compressor to an inlet of the compressor to reheat the pressurized air; and wherein the surge control valve is modulated between the open and closed positions in response to a compressor outlet temperature detected by a compressor outlet temperature sensor.

10. A method of controlling an air conditioning system comprising the steps of:

a) determining a desired conditioned airflow;

b) commanding an air conditioning pack to produce the desired conditioned airflow based upon a desired level of air supplied to air conditioning pack;

c) commanding an electric motor driving a compressor to provide the desired pressurized air; and d) commanding a diffuser between positions to obtain a desired compressor efficiency based upon a flow through the air conditioning system.

11. The method according to claim 10, comprising the step of determining compressor flow by measuring compressor inlet and outlet pressures and compressor outlet temperature.

12. The method according to claim 11, comprising the step of commanding a surge valve to a desired position to recirculate compressed air from the compressor back to the compressor, the recirculated compressed air providing the desired pressurized air at a desired temperature.

13. The method according to claim 12, wherein the surge control valve is modulated between open and closed positions in response to the compressor outlet temperature.

* * * * *